(12) United States Patent
Muto et al.

(10) Patent No.: US 12,531,650 B2
(45) Date of Patent: Jan. 20, 2026

(54) SUSPICIOUS AIRCRAFT COUNTERMEASURE DEVICE, SUSPICIOUS AIRCRAFT COUNTERMEASURE METHOD, AND RECORDING MEDIUM

(71) Applicant: NEC Corporation, Tokyo (JP)

(72) Inventors: Tomoyuki Muto, Tokyo (JP); Shohei Ikeda, Tokyo (JP); Kenichi Keyaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 372 days.

(21) Appl. No.: 18/274,399

(22) PCT Filed: Jul. 14, 2021

(86) PCT No.: PCT/JP2021/026397
§ 371 (c)(1),
(2) Date: Jul. 26, 2023

(87) PCT Pub. No.: WO2023/286186
PCT Pub. Date: Jan. 19, 2023

(65) Prior Publication Data
US 2024/0097813 A1 Mar. 21, 2024

(51) Int. Cl.
*H04K 3/00* (2006.01)
(52) U.S. Cl.
CPC .................. *H04K 3/825* (2013.01)
(58) Field of Classification Search
CPC ............ H04K 3/825; H04K 3/92; H04K 3/65; H04K 3/224; H04K 2203/22
See application file for complete search history.

(56) References Cited

U.S. PATENT DOCUMENTS

| 2017/0092138 A1* | 3/2017 | Trundle | .................... H04K 3/82 |
| 2022/0100209 A1* | 3/2022 | Vallelonga | ............. G05D 1/606 |
| 2024/0044621 A1* | 2/2024 | Kusens | .................... F41H 11/08 |

FOREIGN PATENT DOCUMENTS

| JP | 2017-016249 A | 1/2017 |
| JP | 2018-165931 A | 10/2018 |

(Continued)

OTHER PUBLICATIONS

International Search Report for PCT Application No. PCT/JP2021/026397, mailed on Aug. 31, 2021.

(Continued)

*Primary Examiner* — Keith Ferguson
(74) *Attorney, Agent, or Firm* — Sughrue Mion, PLLC

(57) ABSTRACT

In order to deal with suspicious aircraft, which are unmanned aircraft that are not authorized to fly in a surveillance airspace, while preventing adverse effects on authorized aircraft, which are unmanned aircraft that are authorized to fly in the surveillance airspace, this device for dealing with suspicious aircraft includes a detection unit and an instruction unit. The detection unit detects the intrusion of a suspicious aircraft into the surveillance airspace. When the intrusion of a suspicious aircraft into the surveillance airspace is detected, the instruction unit outputs an evacuation command to evacuate the authorized aircraft from an area where the suspicious aircraft is dealt with, containing the suspicious aircraft. The instruction unit also outputs a command to deal with the suspicious aircraft in the surveillance airspace after the authorized aircraft has evacuated from the area where the suspicious aircraft is dealt with.

15 Claims, 10 Drawing Sheets

(56) References Cited

FOREIGN PATENT DOCUMENTS

WO  2017/017984  A1  2/2017
WO  2020/070897  A1  4/2020

OTHER PUBLICATIONS

English translation of Written opinion for PCT Application No. PCT/JP2021/026397, mailed on Aug. 31, 2021.
JP Office Action for JP Application No. 2023-534499, mailed on Jun. 25, 2024 with English Translation.

* cited by examiner

Fig.3

| NAME | FEATURE | DETECTION DISTANCE | WEATHER PROPERTY | DISADVANTAGE |
|---|---|---|---|---|
| RADIO-WAVE DETECTION SENSOR (PASSIVE SENSOR) | DETECT RADIO WAVES FROM UNMANNED AIRCRAFT AND IDENTIFY THEIR POSITIONS | APPROXIMATELY 1 Km | LESS AFFECTED BY WEATHER | DETECTION IS NOT POSSIBLE DEPENDING ON RADIO ENVIRONMENT. UNMANNED AIRCRAFT NOT EMITTING RADIO WAVES CANNOT BE DETECTED. |
| CAMERA | CAPTURE IMAGES OF SURVEILLANCE AIRSPACE AND CAN DETECT UNMANNED AIRCRAFT BY OBJECT RECOGNITION ON CAPTURED IMAGES | SEVERAL HUNDRED METERS | AFFECTED BY WEATHER | CANNOT DETECT UNMANNED AIRCRAFT HIDDEN BEHIND OBJECTS. SHORT DETECTION DISTANCE. |
| RADAR | DETECT UNMANNED AIRCRAFT BY RADIATING AND RECEIVING RADIO WAVES | SEVERAL Km | LESS AFFECTED BY WEATHER | SINCE IT SCANS WITH RADIO WAVES, IF SURVEILLANCE AREA IS WIDE, DELAY WILL OCCUR IN OBJECT DETECTION. |
| LIDAR | DETECT UNMANNED AIRCRAFT BY EMITTING AND RECEIVING LASER | SEVERAL HUNDRED METERS | AFFECTED BY RAIN | CANNOT DETECT UNMANNED AIRCRAFT HIDDEN BEHIND OBJECTS. SHORT DETECTION DISTANCE. |

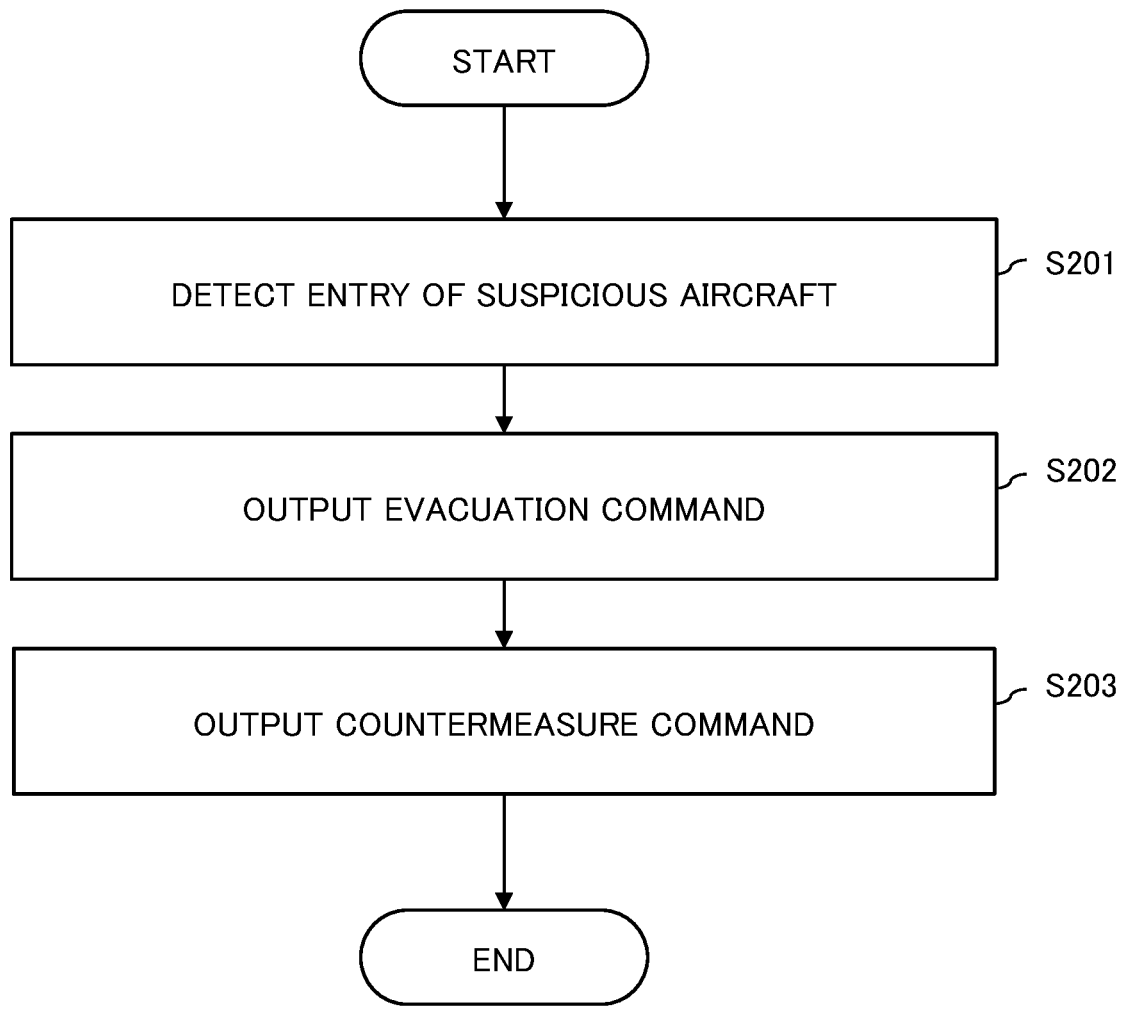

SUSPICIOUS AIRCRAFT COUNTERMEASURE DEVICE, SUSPICIOUS AIRCRAFT COUNTERMEASURE METHOD, AND RECORDING MEDIUM

This application is a National Stage Entry of PCT/JP2021/026397 filed on Jul. 14, 2021, the contents of all of which are incorporated herein by reference, in their entirety.

TECHNICAL FIELD

The present invention relates to a technique for taking countermeasures against a suspicious unmanned aircraft not authorized to fly.

BACKGROUND ART

In logistics, infrastructure inspections, and the like, manpower shortage is a problem. As a solution to this problem, utilization of an unmanned aircraft is considered. Here, the unmanned aircraft is an airplane, a rotorcraft, a glider, an airship, or the like that can be used for aviation, and is capable of being flown by remote control or automatic control among airplanes, rotorcraft, gliders, airships, and the like on which a person cannot ride due to their structure. Such an unmanned aircraft is also referred to as a drone, an unmanned aerial vehicle (UAV), or the like.

Regarding the flight of the unmanned aircraft, in an airspace that may affect the safety of the flight of the aircraft or in an airspace that is highly likely to harm a person on the ground or the like when the unmanned aircraft falls, it is necessary to obtain authorization in advance to fly in the airspace in order to ensure safety. However, when many unmanned aircrafts fly around with an increase in use of the unmanned aircrafts, there is a concern that flight of an unmanned aircraft (hereinafter, also referred to as a suspicious aircraft) that is not authorized increases in an airspace in which flight authorization is required.

PTL 1 (WO 2020/070897 A) discloses a technique of making an unmanned aircraft that has entered an area where entry is prohibited uncontrollable or forcibly landing the unmanned aircraft.

CITATION LIST

Patent Literature

PTL 1: WO 2020/070897 A

SUMMARY OF INVENTION

Technical Problem

As a countermeasure against a suspicious aircraft, there is radio wave jamming. That is, an unmanned aircraft performs wireless communication with an operation device that operates the unmanned aircraft. The radio wave (hereinafter, also referred to as an operation radio wave) used in the wireless communication includes a signal related to the operation of the unmanned aircraft. As a countermeasure against a suspicious aircraft, there is a countermeasure that interferes with communication of an operation radio wave between the suspicious aircraft and an operation device to hinder flight control of the suspicious aircraft. This countermeasure is also referred to as radio wave jamming or jamming.

In addition, as another countermeasure against the suspicious aircraft, there is a countermeasure of capturing the suspicious aircraft by a network (net). In this method, an unmanned aircraft (hereinafter, also referred to as a capturing aircraft) provided with a net is used, or a projection gun that projects the net is used.

Furthermore, as another countermeasure against the suspicious aircraft, there are a countermeasure of preventing the flight of the suspicious aircraft by laser irradiation or the like, and a countermeasure of forcibly landing the suspicious aircraft by controlling a control device (computer) mounted on the suspicious aircraft by hacking.

As described above, it is assumed that many unmanned aircrafts fly around with an increase in the use of unmanned aircrafts. In such a case, in an airspace where flight authorization is required, there is a concern about an increase in the flight of not only an unmanned aircraft (hereinafter, also referred to as an authorized aircraft) that has been authorized but also a suspicious aircraft. Therefore, in a case where the flight of the suspicious aircraft is detected, it is conceivable to execute the above-described countermeasure on the suspicious aircraft. However, if the authorized aircraft and the suspicious aircraft are flying together in the same airspace, the following problem may occur. That is, the problem is that there is a possibility that the countermeasure against the suspicious aircraft affects the authorized aircraft and adversely affects the flight of the authorized aircraft.

The present invention has been devised in order to solve the above problems. That is, a main object of the present invention is to provide a technique for taking countermeasures against a suspicious aircraft while preventing an adverse effect on an authorized aircraft.

Solution to Problem

In order to achieve the above object, a suspicious aircraft countermeasure device according to an aspect of the present invention includes: a detection means configured to detect entry of a suspicious aircraft, which is an unmanned aircraft not authorized to fly in a surveillance airspace, into the surveillance airspace; and an instruction means configured to, when detecting entry of a suspicious aircraft into the surveillance airspace, output an evacuation command to evacuate an authorized aircraft, which is an unmanned aircraft authorized to fly in the surveillance airspace, from a countermeasure area including the suspicious aircraft, and output a countermeasure command to take countermeasures against the suspicious aircraft in the surveillance airspace in a state where the authorized aircraft has evacuated from the countermeasure area.

Further, a suspicious aircraft countermeasure system according to an aspect of the present invention includes: the suspicious aircraft countermeasure device; an operation device that receives an evacuation command output from the suspicious aircraft countermeasure device and evacuates the authorized aircraft from the countermeasure area in response to the evacuation command; and a countermeasure device that receives a countermeasure command output from the suspicious aircraft countermeasure device and takes countermeasures against the suspicious aircraft in the surveillance airspace in a state where the authorized aircraft has evacuated from the countermeasure area in response to the countermeasure command.

Further, a suspicious aircraft countermeasure method according to an aspect of the present invention causes a computer to execute: detecting entry of a suspicious aircraft into a surveillance airspace, the suspicious aircraft being an unmanned aircraft not authorized to fly in the surveillance airspace; outputting an evacuation command for evacuating an authorized aircraft, which is an unmanned aircraft authorized to fly in the surveillance airspace, from a countermeasure area including the suspicious aircraft when entry of the suspicious aircraft into the surveillance airspace is detected; and outputting a countermeasure command for taking countermeasures against the suspicious aircraft in the surveillance airspace in a state where the authorized aircraft has evacuated from the countermeasure area.

Furthermore, a program storage medium according to an aspect of the present invention stores a computer program for causing a computer to execute: a process of detecting entry of a suspicious aircraft into a surveillance airspace, the suspicious aircraft being an unmanned aircraft not authorized to fly in the surveillance airspace; and a process of outputting an evacuation command for evacuating an authorized aircraft, which is an unmanned aircraft authorized to fly in the surveillance airspace, from a countermeasure area including the suspicious aircraft when entry of the suspicious aircraft into the surveillance airspace is detected, and outputting a countermeasure command for taking countermeasures against the suspicious aircraft in the surveillance airspace in a state where the authorized aircraft has evacuated from the countermeasure area.

Advantageous Effects of Invention

According to the present invention, it is possible to take countermeasures against a suspicious aircraft while preventing an adverse effect on an authorized aircraft.

BRIEF DESCRIPTION OF DRAWINGS

FIG. 3 is a diagram illustrating an example of a sensor used for detection of an unmanned aircraft.

FIG. 11 is a flowchart illustrating an operation example of a suspicious aircraft countermeasure device according to another example embodiment.

EXAMPLE EMBODIMENT

Hereinafter, an example embodiment according to the present invention will be described with reference to the drawings.

First Example Embodiment

Figure 1:
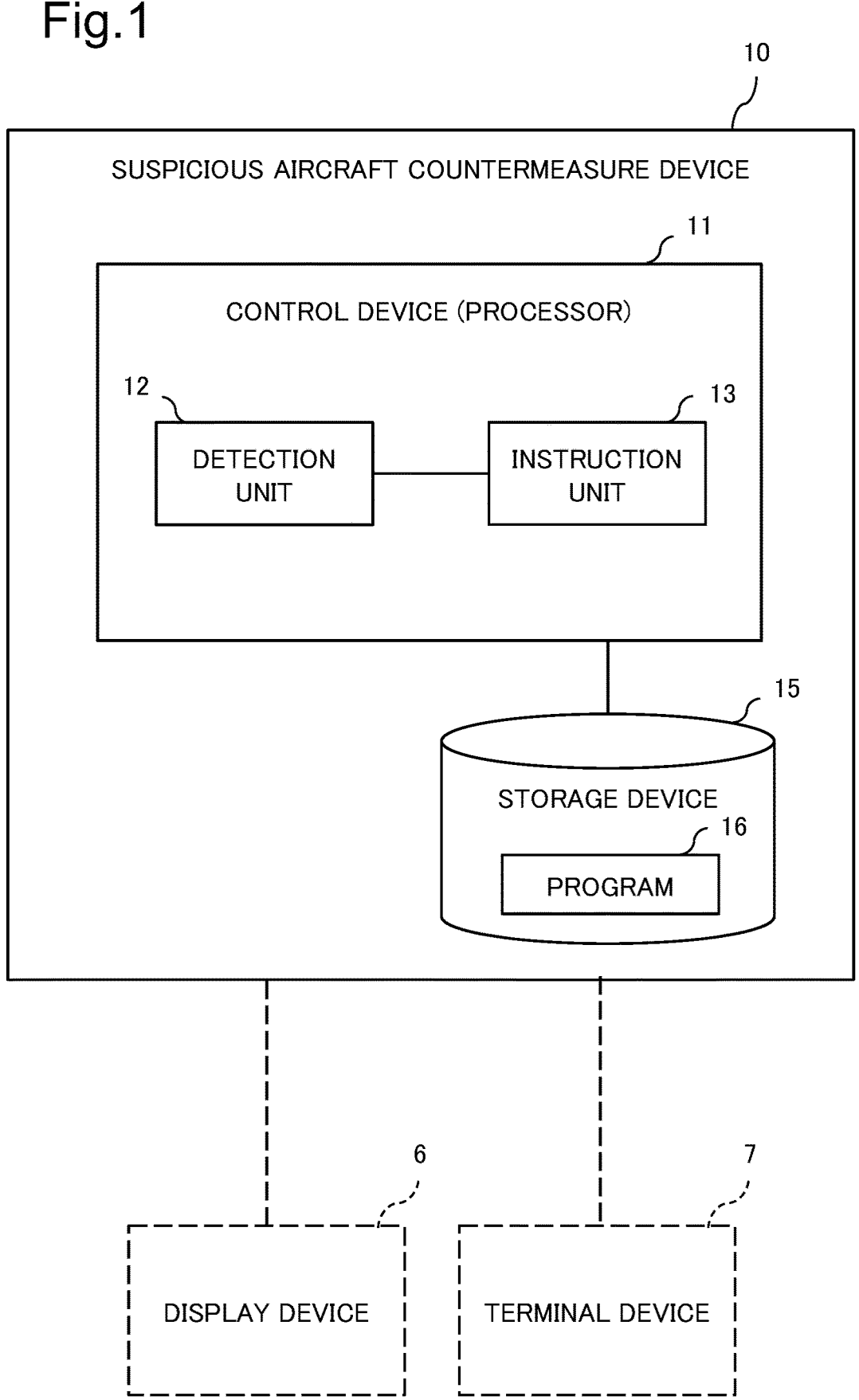
FIG. 1 is a block diagram illustrating a configuration of a suspicious aircraft countermeasure device according to a first example embodiment of the present invention.
Figure 2:
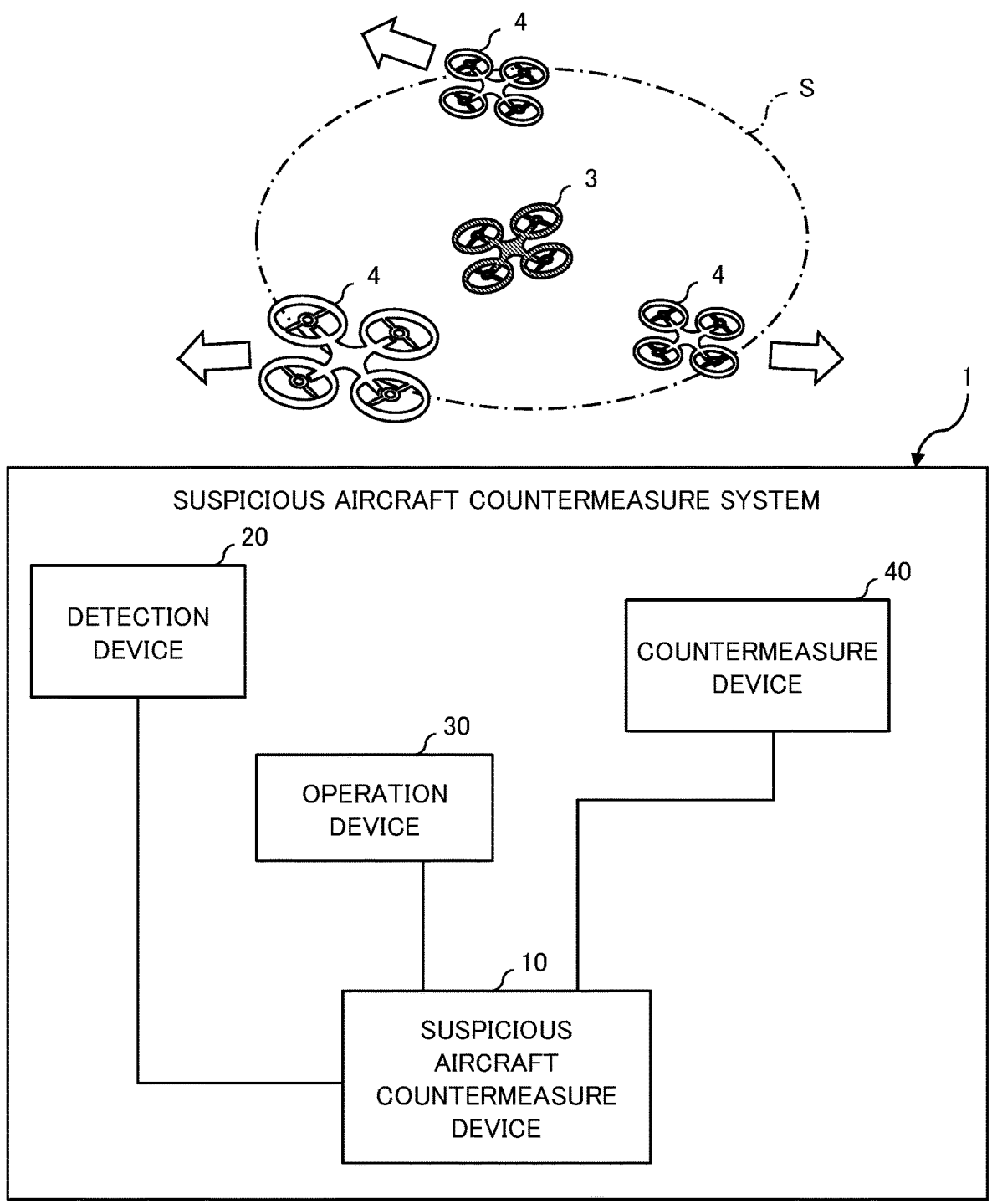
FIG. 2 is a diagram for explaining a configuration of a suspicious aircraft countermeasure system including the suspicious aircraft countermeasure device of the first example embodiment.

FIG. 1 is a block diagram illustrating a configuration of a suspicious aircraft countermeasure device according to a first example embodiment of the present invention. A suspicious aircraft countermeasure device 10 of the first example embodiment is a device that is incorporated in a suspicious aircraft countermeasure system 1 as illustrated in FIG. 2 and takes countermeasures against a suspicious aircraft 3. Here, as described above, the suspicious aircraft is an unmanned aircraft that is not authorized in an airspace in which flight authorization is required. As described above, the unmanned aircraft herein is an airplane, a rotorcraft, a glider, an airship, or the like that can be used for aviation, and is capable of being flown by remote control or automatic control among airplanes, rotorcraft, gliders, airships, and the like on which a person cannot ride due to their structure. Unmanned aircrafts include so-called drones and flying vehicles.

As illustrated in FIG. 2, the suspicious aircraft countermeasure system 1 includes a suspicious aircraft countermeasure device 10, a detection device 20, an operation device 30, and a countermeasure device 40.

The detection device 20 is a sensor that detects an unmanned aircraft in a surveillance airspace. The surveillance airspace is an airspace including an airspace that requires authorization for flight of the unmanned aircraft, and is set in advance for surveillance. Specific examples of the surveillance airspace include airspaces above and around important facilities such as airports, power plants, commercial facilities, stadiums, oil complexes, and governmental facilities. In addition, specific examples of the surveillance airspace include a route of an unmanned aircraft related to logistics for which flight authorization is given, and a route (corridor) of an aircraft other than the unmanned aircraft and airspaces around the route.

There are a plurality of types of sensors used for detection of an unmanned aircraft in a surveillance airspace. FIG. 3 illustrates a specific example of a sensor used for detection of such an unmanned aircraft. In other words, the sensors employed in the detection device 20 may be appropriately selected in consideration of the presence or absence of buildings and facilities in the surveillance airspace, the size of the buildings and facilities, the environment such as the radio wave conditions, the size of the surveillance airspace, and the like. As one of the sensors employed in the detection device 20, there is a radio-wave detection sensor (passive radar). The radio-wave detection sensor is a sensor that detects a radio wave (operation radio wave (that is, a radio wave for transmitting a signal from the operation device to the unmanned aircraft or a radio wave for transmitting a signal from the unmanned aircraft to the operation device)) communicated between an unmanned aircraft and an operation device that operates (steers) the unmanned aircraft. Information indicating a detection result from the radio-wave detection sensor is output, and the position of the unmanned aircraft can be specified based on the information.

In a case where the detection device 20 includes a radio-wave detection sensor, the number of radio-wave detection sensors may be one or more. For example, since the surveillance airspace is wide, one radio-wave detection sensor may not detect the entire surveillance airspace. In such a case, a plurality of radio-wave detection sensors is installed so that the entire surveillance airspace can be detected.

In addition, one of other sensors adopted in the detection device 20 is a camera. The camera captures an image of the surveillance airspace and outputs the captured image as detection result information. The captured image by the camera is processed by the object recognition technology, whereby the unmanned aircraft can be detected from the captured image. Examples of the camera used for detection of the unmanned aircraft include a visible light camera and an infrared camera.

In a case where the detection device 20 includes a camera, the number of cameras may be one or plural. For example, when there is an obstacle such as a building that blocks the field of view of the camera in the surveillance airspace, an area that is a blind spot for the camera occurs in the surveillance airspace. In such a case, a plurality of cameras as the detection device 20 is installed so as to eliminate blind spots in the surveillance airspace. By using a plurality of cameras in this manner, blind spots can be eliminated, and furthermore, since the surveillance airspace is captured by the plurality of cameras from different directions, it is easy to specify the position of the unmanned aircraft in the surveillance airspace based on images captured by the cameras.

Furthermore, the camera used as the detection device 20 is not limited to a fixed one, and may be, for example, a portable camera. An aspect of the portable camera is not limited, and for example, the portable camera may be incorporated in a wearable terminal (eyeglass-type or the like), or may be incorporated in a portable terminal device such as a smartphone or a tablet terminal. The portable camera is carried or attached by, for example, a security guard monitoring the surveillance airspace or an employee in or around the surveillance airspace, and captures the surveillance airspace manually or under computer control. Note that it is preferable that a device (single camera device, wearable terminal, mobile terminal device, and the like) including a portable camera used as the detection device 20 has a communication function of transmitting captured images from moment to moment so that images captured by the portable camera can be used in real time.

Furthermore, as another sensor adopted in the detection device 20, there is a radar. The radar emits a radio wave and receives a reflected wave of the radio wave reflected by an object, so that the radar can calculate the presence or absence of the object, the distance to the object, and the direction based on the time from the emission of the radio wave to the reception of the radio wave as the reflected wave and the direction in which the reflected wave is received. Note that some radars are used for social infrastructure systems such as air traffic control, weather observation, and ship operation. In the radar, the frequency of the radio wave and the power of the radiation are different depending on the application.

In a case where the detection device 20 includes a radar, the number of radars may be one or plural. Since the radar changes the radiation direction of the radio wave so as to scan the surveillance airspace, if the surveillance airspace is wide, the time required to scan the entire surveillance airspace once becomes long, and there is a risk that the delay from the entry of the suspicious aircraft into the surveillance airspace to the detection by the radar becomes long. In order to shorten such a delay, it is conceivable to narrow an area scanned with radio waves of each radar using a plurality of radars.

In addition, when the surveillance airspace is, for example, an airport, interference with radio waves of existing air traffic control radars becomes a problem, and thus it is difficult to newly provide another radar. In such a case, an air traffic control radar may also be used as the detection device 20. Depending on the surveillance airspace where it is difficult to provide a new radar as described above, an existing radar such as a marine radar or a weather radar may also be used as the detection device 20.

Figure 4:
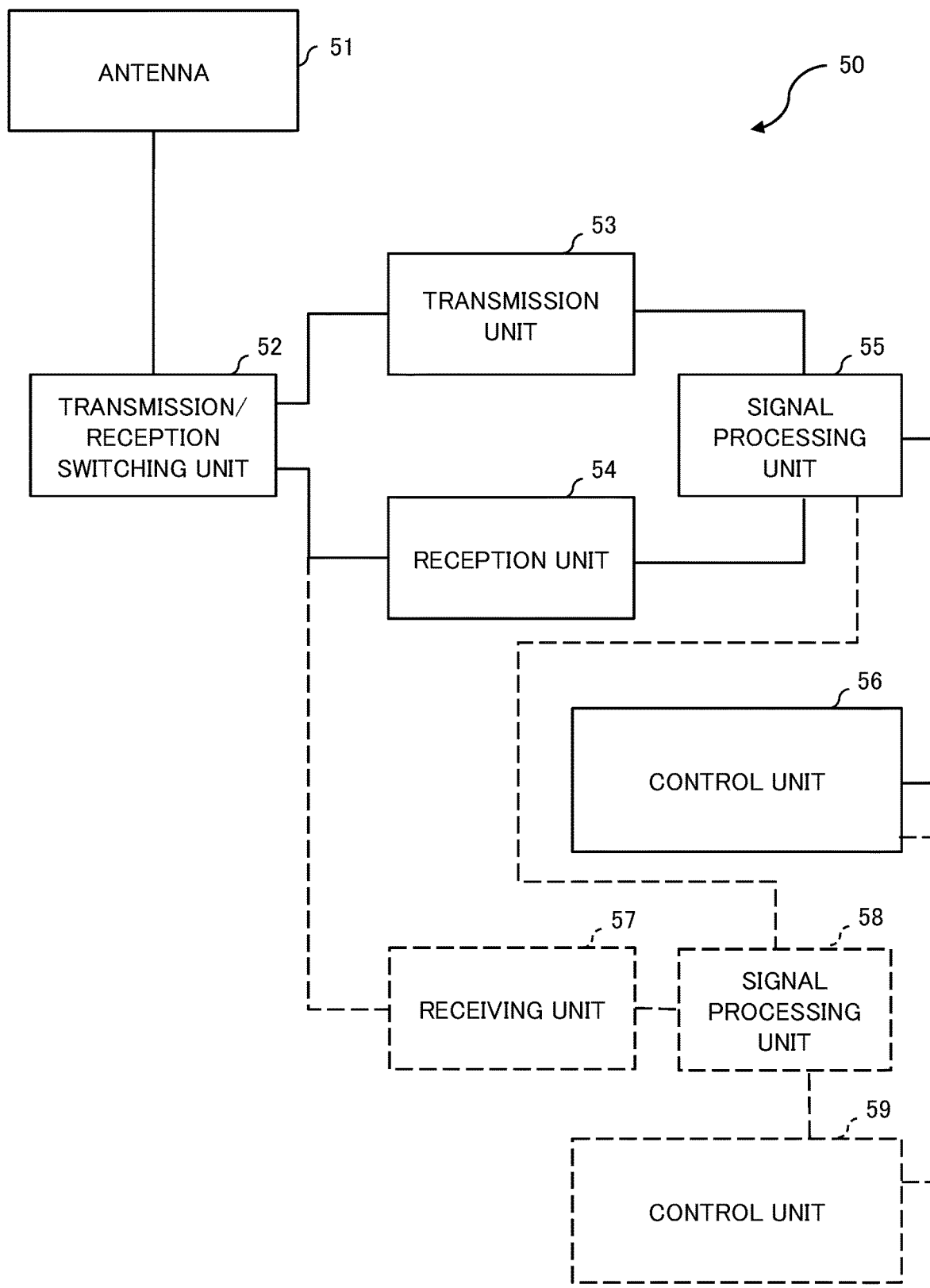
FIG. 4 is a block diagram illustrating an example of a configuration of a radar device.

Incidentally, FIG. 4 is a block diagram illustrating a main configuration of a radar device. As indicated by a solid line in FIG. 4, a radar device 50 includes an antenna 51, a transmission/reception switching unit 52, a transmission unit 53, a reception unit 54, a signal processing unit 55, and a control unit 56.

The antenna 51 has a configuration for transmitting and receiving radio waves (for example, microwaves). The transmission/reception switching unit 52 is configured to switch and connect the antenna 51 to one of the transmission unit 53 and the reception unit 54, and alternately switches between a state in which the antenna 51 is connected to the transmission unit 53 and a state in which the antenna 51 is connected to the reception unit 54 at a set cycle.

The transmission unit 53 has a circuit configuration that generates a transmission signal based on the radio wave radiated from the antenna 51 based on the pulse signal supplied from the signal processing unit 55. The reception unit 54 has a circuit configuration that amplifies and detects a reception signal based on the radio wave received by the antenna 51 to extract a reflection signal for the pulse signal on the transmission side, and outputs the reflection signal to the signal processing unit 55.

The signal processing unit 55 has a circuit configuration that outputs a pulse signal to the transmission unit 53 and performs signal processing on the signal output from the reception unit 54 by a predetermined method, and outputs a digital signal by the signal processing to the control unit 56. The control unit 56 includes a computer device such as a personal computer (PC) or a server, and executes, for example, a control operation of displaying a detection result on a display device or the like based on a signal received from the signal processing unit 55. The information of the detection result from the radar is output from the control unit 56, for example.

As described above, when an existing radar device such as an air traffic control radar, a marine radar, or a weather radar is also used as the detection device 20, the radar device 50 may be provided with a receiving-side configuration for the detection device 20 as indicated by a dotted line in FIG. 4. That is, the radar device 50 used as the detection device 20 may include the reception unit 57, the signal processing unit 58, and the control unit 59 for the detection device 20. The reception unit 57 has a circuit configuration similar to that of the reception unit 54, and the signal processing unit 58 has a configuration for processing the signal output from the reception unit 57. The signal processing unit 58 may not have a configuration for signal processing on the transmission side, and may acquire information related to signal processing on the transmission side from the signal processing unit 55 as necessary. The control unit 59 executes, for example, a control operation of displaying a detection result of the unmanned aircraft on a display device or the like based on the signal (that is, the digital signal based on the signal received by the antenna 51) output from the signal processing unit 58. As described above, in a case where the configuration for the detection device 20 incorporated in the suspicious aircraft countermeasure system 1 is provided in the radar device 50, information on the detection result from the radar is output from the control unit 59 toward the suspicious aircraft countermeasure device 10.

The reception unit 57 and the signal processing unit 58 for the detection device 20 may be provided in a common device as the reception unit 54 and the signal processing unit 55 for existing radars, or may be provided as one separate device. Furthermore, the control unit 59 for the detection device 20 may be configured by the same computer device as the computer device constituting the control unit 56 for existing radars, or may be configured by another computer device.

As described above, by providing the radar device 50 with the configuration on the reception side for the detection device 20, it is easy to cause the radar device 50 to have the function of detecting an unmanned aircraft without affecting the function as an existing radar.

Furthermore, LIDAR is one of other sensors adopted in the detection device 20. The LIDAR emits laser light and receives reflected light of the laser light reflected by the object, so that the LIDAR can calculate the presence or absence of the object, the distance to the object, and the direction based on the time from the emission of the laser light to the reception of the laser light as reflected light and the direction in which the reflected light is received. Note that there is a case where the LIDAR is used in the field of weather, and in this case, for example, the LIDAR is used for detection of air flow such as air turbulence. For this reason, it is also possible to detect the unmanned aircraft by detecting the airflow caused by the flight of the unmanned aircraft instead of detecting the unmanned aircraft itself by the LIDAR.

In a case where the detection device 20 includes a LIDAR, the number of LIDARs may be one or more. Since the LIDAR changes the radiation direction of the laser light so as to scan the surveillance airspace, if the surveillance airspace is wide, similarly to the radar, the time required to scan the entire surveillance airspace once becomes long, and there is a risk that the delay from when the suspicious aircraft enters the surveillance airspace until the suspicious aircraft is detected becomes long. In order to shorten such a delay, it is conceivable to narrow an area scanned with radio waves of each LIDAR using a plurality of LIDARs.

The detection device 20 is not necessarily configured by one type of sensor as described above, and may be configured by a combination of a plurality of types of sensors. That is, each of the sensors that can be employed as the detection device 20 has advantages and disadvantages. For this reason, the detection device 20 may be configured by combining a plurality of types of sensors so as to complement the disadvantages. For example, the detection device 20 may be configured by combining a radio-wave detection sensor, at least one of a radar and a LIDAR, and a camera. The camera is easy to detect the appearance and shape of the unmanned aircraft, but is difficult to detect the flight position. On the other hand, the radio-wave detection sensor, the radar, and the LIDAR easily detect the flight position of the unmanned aircraft, but it is difficult to acquire the appearance of the unmanned aircraft. For this reason, the detection of the flight position of the unmanned aircraft and the acquisition of the appearance and the shape are facilitated by combining the radio-wave detection sensor, at least one of the radar and the LIDAR, and the camera. The combination of the plurality of types of sensors constituting the detection device 20 is not limited to the above combination.

The operation device 30 constituting the suspicious aircraft countermeasure system 1 illustrated in FIG. 2 is a device that operates an unmanned aircraft by wireless communication with the unmanned aircraft. Here, it is assumed that the operation device 30 operates an authorized aircraft 4.

Figure 5:
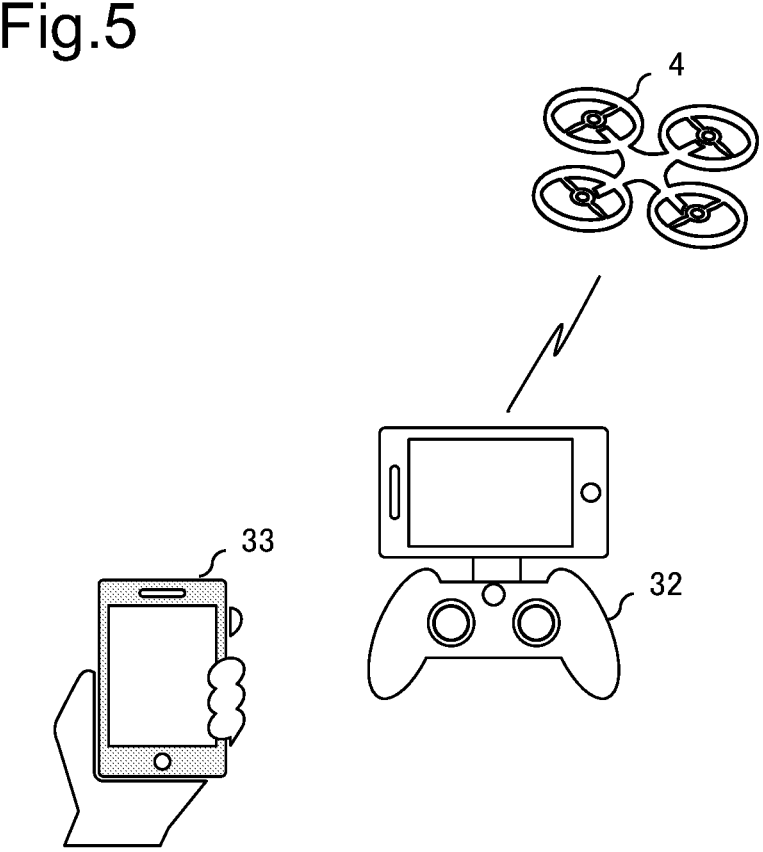
FIG. 5 is a diagram illustrating a configuration example of an operation device.

The configuration of the operation device 30 corresponds to the type of the unmanned aircraft. The unmanned aircraft is roughly classified into a computer control type and a manual operation type. The computer control type is a type in which a computer device mounted on an unmanned aircraft controls the flight of the unmanned aircraft according to a computer program provided in advance while using a sensor output such as a position detection sensor. The manual operation type is a type in which the flight of the unmanned aircraft is operated by a remote operation of the pilot using a controller 32 as shown in FIG. 5 that wirelessly communicates with the unmanned aircraft.

In the first example embodiment, the authorized aircraft 4 is not limited to either the computer control type or the manual operation type, but may be either one, and the operation device 30 has a configuration corresponding to the type of the authorized aircraft 4 assumed to fly in the surveillance airspace. In addition, the number of operation devices 30 included in the suspicious aircraft countermeasure system 1 is not limited to one, and may be plural, and the number of operation devices 30 is appropriately set according to the number, the number of types, and the like of the authorized aircraft 4 scheduled to fly in the surveillance airspace.

In the first example embodiment, a command related to countermeasures against the suspicious aircraft 3 is output from the suspicious aircraft countermeasure device 10 to the operation device 30. The operation device 30 has a function of executing an operation based on a command from the suspicious aircraft countermeasure device 10. For example, in a case where the authorized aircraft 4 is a computer control type and a computer program corresponding to a command from the suspicious aircraft countermeasure device 10 is given to the authorized aircraft 4 in advance, the operation device 30 receives the command from the suspicious aircraft countermeasure device 10 and transfers the command to the authorized aircraft 4. As a result, the authorized aircraft 4 executes an operation according to the command from the suspicious aircraft countermeasure device 10.

In addition, even if the authorized aircraft 4 is a computer control type, it is assumed that there is a case where the computer program corresponding to the command from the suspicious aircraft countermeasure device 10 is not given to the authorized aircraft 4. Furthermore, it is also assumed that the authorized aircraft 4 is of a manual operation type. In such a case, for example, a command from the suspicious aircraft countermeasure device 10 is transmitted to the terminal device 33, for example, as illustrated in FIG. 5, carried by the operator of the authorized aircraft 4. An application program for functioning as a part of the operation device 30 in the suspicious aircraft countermeasure system 1 is given to the terminal device 33. When receiving the command from the suspicious aircraft countermeasure device 10, the terminal device 33 displays information based on the command on the display unit according to the application program. In accordance with this display, the operator of the authorized aircraft 4 operates the authorized aircraft 4 using the controller 32, so that the authorized aircraft 4 performs an operation according to a command from the suspicious aircraft countermeasure device 10. In such a case, the operation device 30 includes the controller 32 and the terminal device 33.

The countermeasure device 40 is a device that takes countermeasures against the suspicious aircraft 3. As a countermeasure against the suspicious aircraft 3, there is a method called radio wave jamming or jamming as described above. In this countermeasure, the flight control of the suspicious aircraft is hindered by interfering with an operation radio wave between the suspicious aircraft 3 and an operation device (not illustrated) that operates the suspicious aircraft 3. In a case of taking countermeasures against the suspicious aircraft 3 based on this countermeasure (jamming), the countermeasure device 40 is configured to generate an interfering radio wave that interferes with the operation radio wave and emit the interfering radio wave toward the suspicious aircraft 3.

Figure 6:
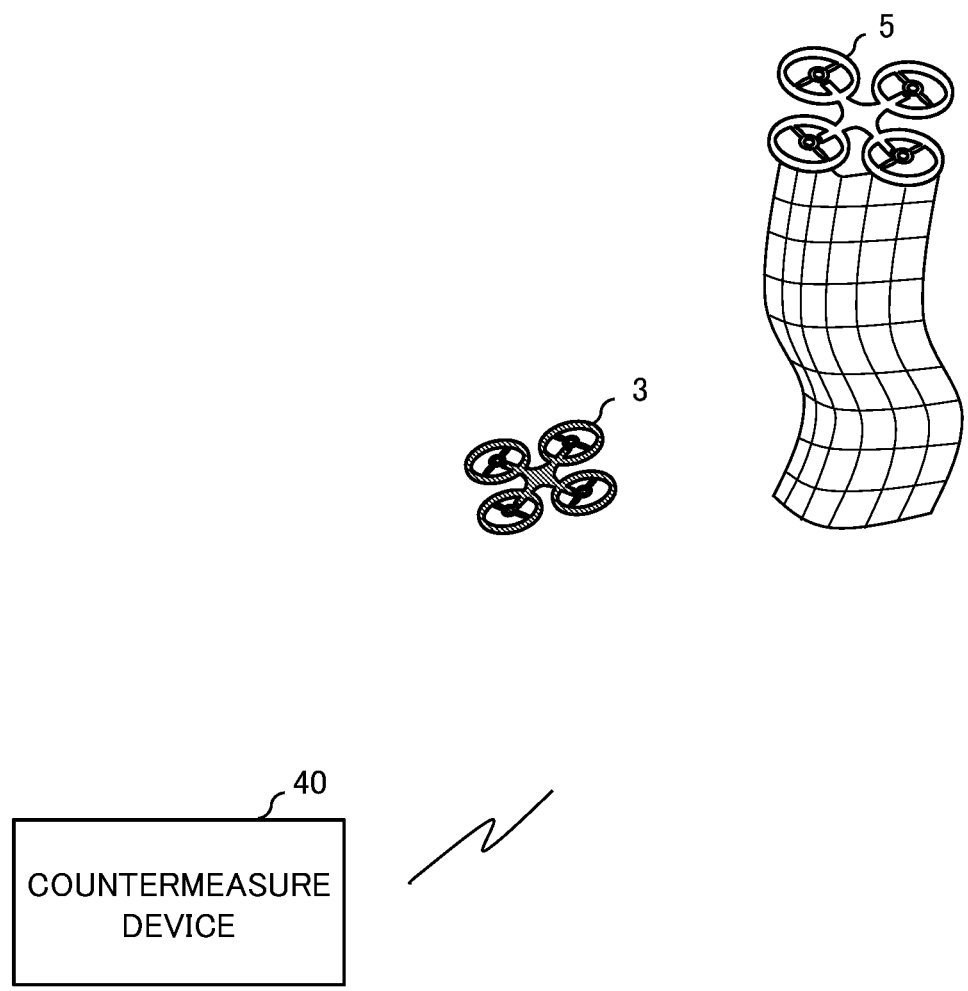
FIG. 6 is a diagram for explaining one of countermeasures against a suspicious aircraft.

In addition, as another countermeasure against the suspicious aircraft 3, there is a countermeasure of capturing the suspicious aircraft 3 by a network (net). In this countermeasure, for example, there are a case of using the capturing aircraft 5 as illustrated in FIG. 6 which is an unmanned aircraft and a case of using a projection gun (not illustrated) that throws a net toward the suspicious aircraft 3. In the case of using the capturing aircraft 5, the countermeasure device 40 has a configuration of operating the capturing aircraft 5 using wireless communication so as to capture the suspicious aircraft 3 by the net. In the case of using the projection gun, the countermeasure device 40 has a configuration for controlling, for example, the direction of the projection gun and the timing of projecting the net so as to capture the suspicious aircraft 3 by the net.

In the first example embodiment, a command related to countermeasures against the suspicious aircraft 3 is output from the suspicious aircraft countermeasure device 10 to the countermeasure device 40. As a result, the countermeasure device 40 further has a function of executing an operation based on a command from the suspicious aircraft countermeasure device 10. For example, the countermeasure device 40 starts the countermeasure operation against the suspicious aircraft 3 with the reception of the command from the suspicious aircraft countermeasure device 10 as a trigger. In addition, in a case where the countermeasure device 40 starts a countermeasure operation against the suspicious aircraft 3 by a manual operation of the operator, for example, a command from the suspicious aircraft countermeasure device 10 is transmitted to a terminal device carried by the operator. An application program for functioning as a part of the countermeasure device 40 in the suspicious aircraft countermeasure system 1 is given to the terminal device. When receiving the command from the suspicious aircraft countermeasure device 10, the terminal device displays, for example, an instruction to start taking countermeasures against the suspicious aircraft 3 on the display unit according to the application program. In accordance with this display, the operator starts emission of the jamming radio wave or operates the capturing aircraft 5 or the projection gun, whereby the countermeasure against the suspicious aircraft 3 is taken. In such a case, the terminal device that receives the command from the suspicious aircraft countermeasure device 10 functions as a part of the countermeasure device 40.

The suspicious aircraft countermeasure device 10 is a computer device, is connected to the detection device 20, the operation device 30, and the countermeasure device 40 as described above, and has a function of controlling the operation of the suspicious aircraft countermeasure system 1 that takes countermeasures against the suspicious aircraft 3 using these devices. As illustrated in FIG. 1, the suspicious aircraft countermeasure device 10 includes a control device 11 and a storage device 15.

The storage device 15 includes a storage medium that stores data and a computer program (hereinafter, also referred to as a program) 16. There are a plurality of types of storage devices such as a magnetic disk device and a semiconductor memory element, and there are a plurality of types of semiconductor memory elements such as a random access memory (RAM) and a read only memory (ROM). The type of the storage device included in the suspicious aircraft countermeasure device 10 is not limited to one. A computer device is often provided with a plurality of types of storage devices. Here, the type and number of storage devices provided in the suspicious aircraft countermeasure device 10 are not limited, and the description thereof will be omitted. In addition, in a case where the suspicious aircraft countermeasure device 10 includes a plurality of types of storage devices 15, they are collectively referred to as the storage device 15.

The control device 11 includes a processor such as a central processing unit (CPU) or a graphics processing unit (GPU). The control device 11 can have various functions based on the program 16 by reading and executing the program 16 stored in the storage device 15. Here, the control device 11 includes a detection unit 12 and an instruction unit 13 as functional units.

The detection unit 12 has a function of receiving information output from the detection device 20 and detecting the flight of the unmanned aircraft in the surveillance airspace based on the information, and a function of detecting whether or not the suspicious aircraft 3 is included in the unmanned aircrafts, that is, detecting the entry of the suspicious aircraft 3 into the surveillance airspace. For example, in a case where the detection device 20 includes a camera, a captured image (moving image) of the surveillance airspace captured by the camera is transmitted from the detection device 20 to the suspicious aircraft countermeasure device 10 at a preset frame rate, for example. The detection unit 12 executes the object recognition processing for every frame of the captured image received from the detection device 20 or every preset number of frames, and detects the presence or absence of the unmanned aircraft in the surveillance airspace and the entry of the suspicious aircraft 3 into the surveillance airspace from the captured image.

A method for detecting the presence or absence of the flight of the unmanned aircraft in the surveillance airspace and the entry of the suspicious aircraft 3 into the surveillance airspace from the captured image is not particularly limited, but for example, an artificial intelligence (AI) technology is used. In this case, a detection model for detecting the unmanned aircraft and the suspicious aircraft 3 in the unmanned aircraft from the captured image is provided to the suspicious aircraft countermeasure device 10 in advance. The detection model is a model that is generated by machine learning of images of a wide variety of unmanned aircrafts and the suspicious aircraft 3 or the authorized aircraft 4 among the unmanned aircrafts, and outputs the unmanned aircraft and the suspicious aircraft 3 among the unmanned aircrafts as a detection result using a captured image as an input. In the case of using the AI technology, the detection unit 12 detects the flight of the unmanned aircraft in the surveillance airspace from the captured image using such a detection model, and detects the entry of the suspicious aircraft 3 into the surveillance airspace.

Since the suspicious aircraft 3 and the authorized aircraft 4 have similar appearances, it may be difficult to distinguish between the suspicious aircraft 3 and the authorized aircraft 4 only with the captured image. Assuming such a case, for example, the suspicious aircraft countermeasure device 10 may be connected to a system that is controlling (operating) the authorized aircraft 4 and acquire a flight status (operation status) of the authorized aircraft 4 in the surveillance airspace. The detection unit 12 may detect the entry of the suspicious aircraft 3 into the surveillance airspace by referring not only to the output of the detection model but also to information on the flight status (operation status) of the authorized aircraft 4 in the surveillance airspace as necessary.

Furthermore, in a case where the detection device 20 includes a radio-wave detection sensor, a radar, or a LIDAR, the detection unit 12 detects the flight of the unmanned aircraft in the surveillance airspace and detects the entry of the suspicious aircraft 3 into the surveillance airspace based on information output from the radio-wave detection sensor, the radar, or the LIDAR. Also in this case, the detection unit 12 is not particularly limited in terms of detecting whether the unmanned aircraft is flying in the surveillance airspace or how to detect the entry of the suspicious aircraft 3 into the surveillance airspace, and the description thereof will be omitted. In addition, the detection unit 12 may refer to the information on the flight status (operation status) of the authorized aircraft 4 in the surveillance airspace as described above as necessary in processing such as detection of entry of the suspicious aircraft 3 into the surveillance airspace.

Furthermore, there is a case where the detection device 20 includes a plurality of types of sensors such as a combination of a radio-wave detection sensor, a camera, a radar, and a LIDAR. In this case, for example, the detection unit 12 executes processing based on information output from each of the plurality of types of sensors constituting the detection device 20, and further executes processing based on a plurality of pieces of information obtained by the processing. In this manner, the detection unit 12 detects the flight of the unmanned aircraft in the surveillance airspace, and further detects the entry of the suspicious aircraft 3 into the surveillance airspace.

Furthermore, when detecting the suspicious aircraft 3, the detection unit 12 may not immediately determine that the unmanned aircraft is the suspicious aircraft 3, but may acquire the flight trajectory of the unmanned aircraft considered to be the suspicious aircraft 3, and determine that the unmanned aircraft is the suspicious aircraft 3 when the trajectory is different from the normal flight pattern provided in advance. That is, the detection unit 12 may detect the flight trajectory of the unmanned aircraft and detect the entry of the suspicious aircraft 3 into the surveillance airspace using the trajectory.

Note that the suspicious aircraft countermeasure device 10 may be connected to the display device 6 or the terminal device 7 as indicated by a dotted line in FIG. 1. The terminal device 7 is, for example, a personal computer (PC), a tablet terminal, a smartphone, a wearable terminal, or the like. For example, the detection unit 12 may output the detection result to the display device 6 or the terminal device 7 and display the detection result on the display device 6 or the display unit of the terminal device 7.

When the detection unit 12 detects the entry of the suspicious aircraft 3 into the surveillance airspace and thus detects that the authorized aircraft 4 is also flying (that is, the suspicious aircraft 3 and the authorized aircraft 4 are flying together) in the surveillance airspace, the instruction unit 13 outputs an evacuation command to evacuate the authorized aircraft 4 from the countermeasure area S. The countermeasure area S is an area including the suspicious aircraft 3, and when the countermeasure device 40 takes countermeasures against the suspicious aircraft 3, the authorized aircraft 4 is assumed to be affected by the countermeasure. That is, when the countermeasure method is jamming, the countermeasure area S is an area assumed to be affected by jamming radio waves, and is determined based on the position of the suspicious aircraft 3, the transmission power of the jamming radio waves, and the like. In a case where the countermeasure is capturing by the net, the countermeasure area S is an area where the capturing aircraft 5 captures the suspicious aircraft 3 or which is assumed to be a projection route of the net from the projection gun, and is determined based on the position, the flight speed, and the like of the suspicious aircraft 3. Note that the countermeasure area S is not limited to the inside of the surveillance airspace. For example, in a case where the flight position of the suspicious aircraft 3 is close to the end of the surveillance airspace, the countermeasure area S may extend from the inside of the surveillance airspace to the outside of the surveillance airspace.

The instruction unit 13 outputs an evacuation command toward the operation device 30. When outputting the evacuation command toward the operation device 30, the instruction unit 13 also outputs information notifying the position, the size, and the like of the countermeasure area S toward the operation device 30. Upon receiving the evacuation command output by the instruction unit 13, the operation device 30 executes an operation of evacuating the authorized aircraft 4 from the countermeasure area S based on the evacuation command.

Further, when the detection unit 12 detects the entry of the suspicious aircraft 3 into the surveillance airspace, the instruction unit 13 outputs a countermeasure command to the countermeasure device 40. The countermeasure command is a command instructing to take countermeasures against the suspicious aircraft 3 in the surveillance airspace in a state where the authorized aircraft 4 has evacuated from the countermeasure area S. The timing at which the instruction unit 13 outputs the countermeasure command may be the same timing as the evacuation command. Alternatively, the output timing of the countermeasure command may be, for example, an appropriate timing after the time when the authorized aircraft 4 is assumed to have evacuated from the countermeasure area S has elapsed from the output of the evacuation command, or after it has been detected that the authorized aircraft 4 has evacuated from the countermeasure area S. Upon receiving the countermeasure command output by the instruction unit 13, the countermeasure device 40 executes the countermeasure operation against the suspicious aircraft 3 in a state where the authorized aircraft 4 has evacuated from the countermeasure area S based on the countermeasure command.

When the detection unit 12 detects the entry of the suspicious aircraft 3 into the surveillance airspace, the instruction unit 13 may immediately output the evacuation command or the countermeasure command, or may output the evacuation command or the countermeasure command when the entry of the suspicious aircraft 3 into the surveillance airspace is continuously or intermittently detected for a preset period (for example, 5 minutes).

Figure 7:
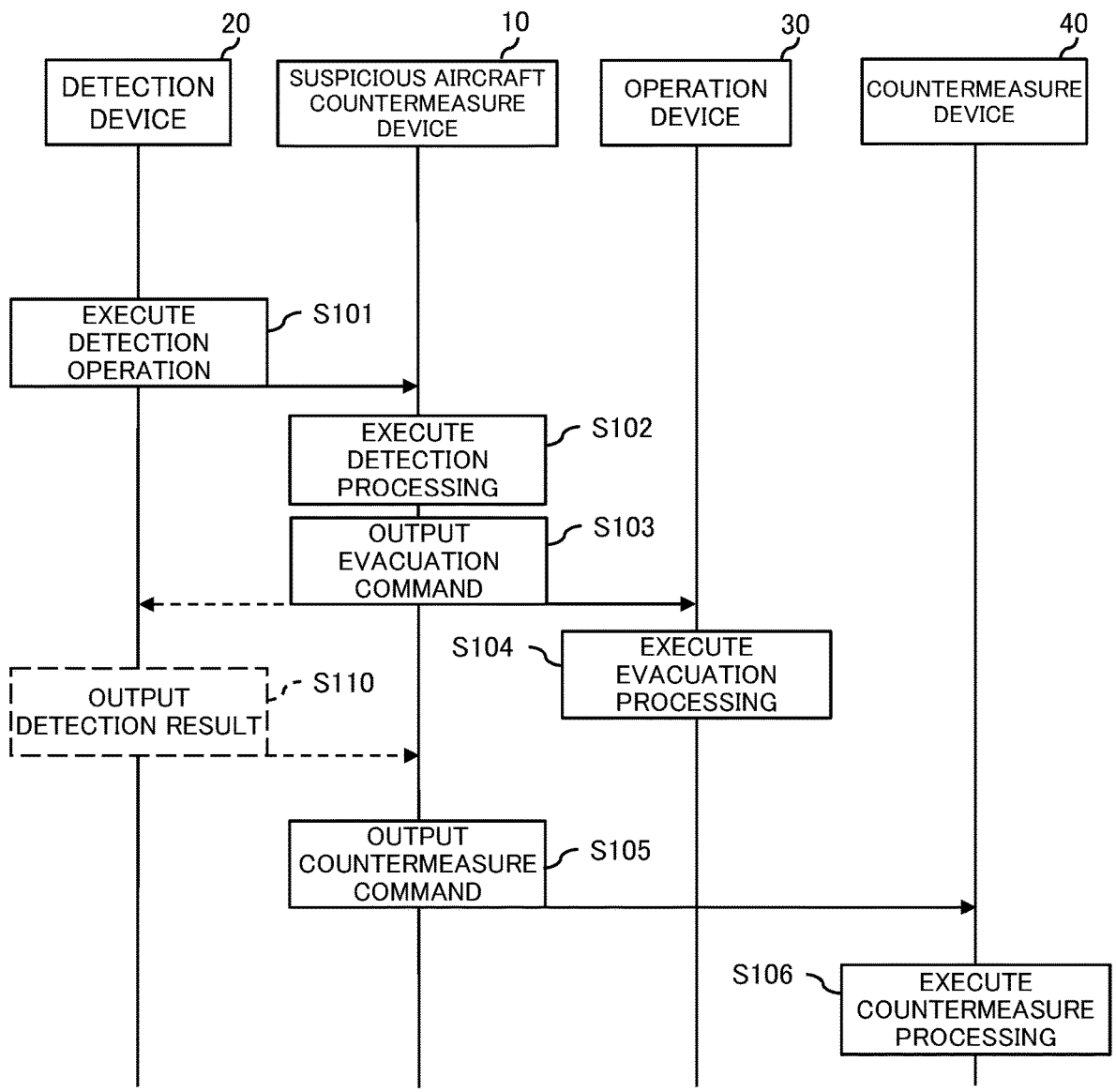
FIG. 7 is a sequence diagram illustrating an operation example related to countermeasures against a suspicious aircraft in the suspicious aircraft countermeasure system of the first example embodiment.

The suspicious aircraft countermeasure device 10 of the first example embodiment and the suspicious aircraft countermeasure system 1 including the same are configured as described above. Next, an example of a countermeasure operation against the suspicious aircraft 3 in the suspicious aircraft countermeasure system 1 will be described with reference to FIG. 7. FIG. 7 is a sequence diagram illustrating an example of a countermeasure operation against the suspicious aircraft 3 in the suspicious aircraft countermeasure system 1.

For example, the detection device 20 continuously executes the operation of detecting the unmanned aircraft in the surveillance airspace by a sensor such as a radio-wave detection sensor, a radar, a camera, or a LIDAR, and continuously outputs the detection result (sensor output) to the suspicious aircraft countermeasure device 10, for example (step S101 in FIG. 7).

The detection unit 12 of the suspicious aircraft countermeasure device 10 executes detection processing using the detection result from the detection device 20 (step S102). In the detection processing by the detection unit 12, it is determined whether the unmanned aircraft is flying in the surveillance airspace, and it is determined whether the suspicious aircraft 3 is included in the unmanned aircrafts, that is, whether the suspicious aircraft 3 has entered into the surveillance airspace.

Then, when the detection unit 12 detects the entry of the suspicious aircraft 3 into the surveillance airspace, the instruction unit 13 outputs an evacuation command to the operation device 30 (step S103). Then, the operation device 30 executes the evacuation processing in response to the evacuation command (step S104). That is, the operation device 30 executes an operation of evacuating the authorized aircraft 4 from the countermeasure area S.

In addition, the instruction unit 13 of the suspicious aircraft countermeasure device 10 outputs a countermeasure command to the countermeasure device 40 (step S105). The timing at which the instruction unit 13 outputs the countermeasure command may be the same timing as the output of the evacuation command, or may be an appropriate timing after the time when the authorized aircraft 4 is assumed to have evacuated from the countermeasure area S has elapsed from the output of the evacuation command. Alternatively, the output timing of the countermeasure command may be an appropriate timing after it is detected that the authorized aircraft 4 has evacuated from the countermeasure area S. In this case, for example, as indicated by a dotted line in FIG. 7, the suspicious aircraft countermeasure device 10 inquires of the detection device 20 about the detection result, so that the detection device 20 outputs the detection result to the suspicious aircraft countermeasure device 10 (step S110). Using the detection result, the instruction unit 13 outputs a countermeasure command to the countermeasure device 40 at an appropriate timing after it is detected that the authorized aircraft 4 has evacuated from the countermeasure area S. Upon receiving the countermeasure command output in this manner, the countermeasure device 40 executes countermeasure processing (step S106). That is, the countermeasure device 40 executes an operation of preventing the flight of the suspicious aircraft 3 by jamming, net capturing, or the like.

When the entry of the suspicious aircraft 3 into the surveillance airspace is detected, the suspicious aircraft countermeasure device 10 of the first example embodiment and the suspicious aircraft countermeasure system 1 including the same take the countermeasure against the suspicious aircraft 3 after the authorized aircraft 4 has evacuated from the countermeasure area S as described above. Therefore, the suspicious aircraft countermeasure device 10 and the suspicious aircraft countermeasure system 1 can prevent the flight of the suspicious aircraft 3 by jamming, net capturing, or the like while preventing adverse effects on the authorized aircraft 4.

Second Example Embodiment

Hereinafter, a second example embodiment according to the present invention will be described. In the description of the second example embodiment, constituent parts having the same names as those used in the description of the first example embodiment are denoted by the same reference numerals, and redundant description of the common parts will be omitted.

Figure 8:
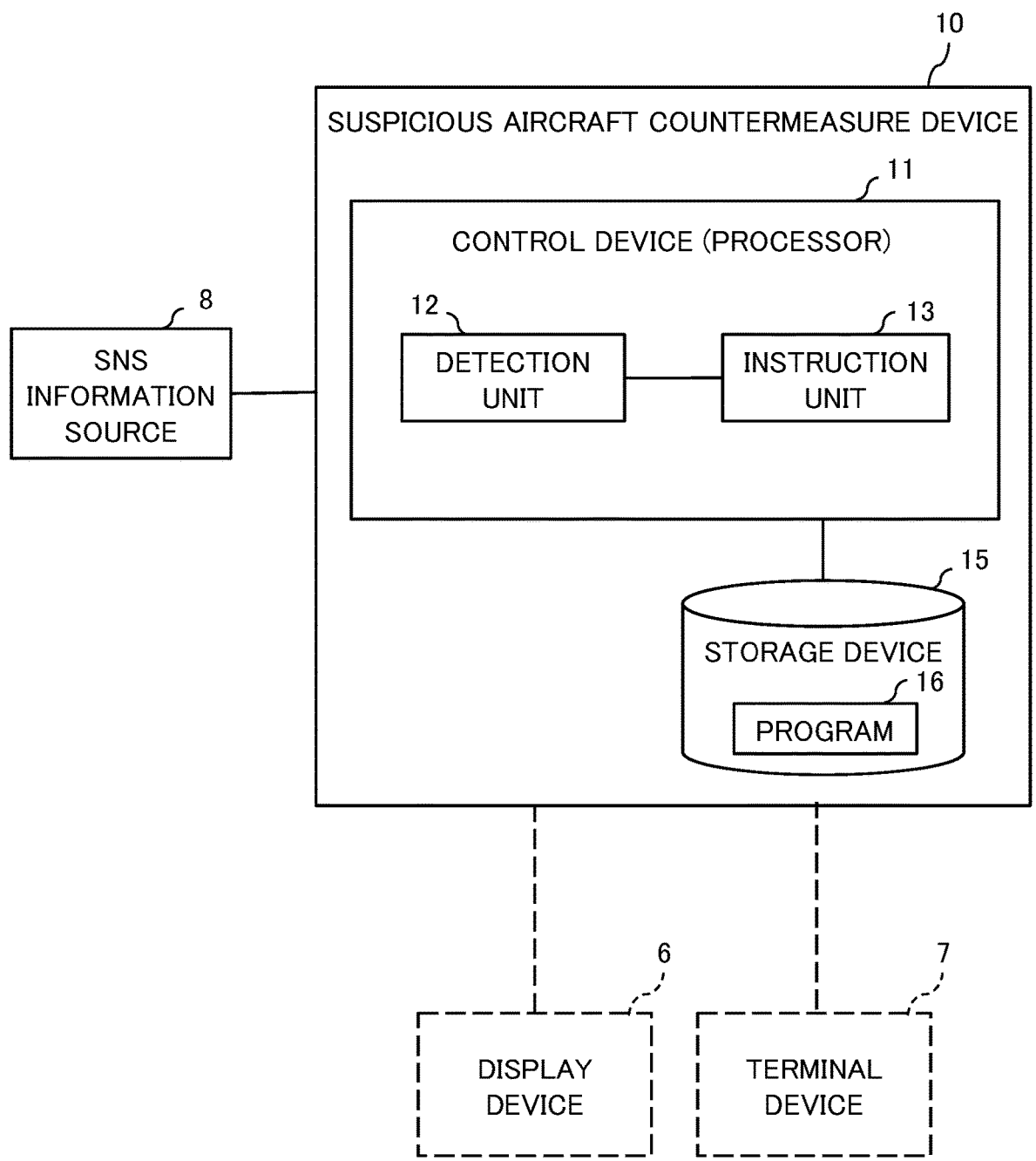
FIG. 8 is a block diagram illustrating a configuration of a suspicious aircraft countermeasure device according to a second example embodiment.

The suspicious aircraft countermeasure device 10 and the suspicious aircraft countermeasure system 1 according to the second example embodiment have the following detection configuration in addition to or instead of the configuration related to detection of the unmanned aircraft and the suspicious aircraft 3 described in the first example embodiment. That is, the suspicious aircraft countermeasure device 10 in the second example embodiment is connected to a social networking service (SNS) information source 8 as illustrated in FIG. 8. Then, the suspicious aircraft countermeasure device 10 has a function of acquiring information posted on the SNS, that is, a comment (hereinafter, also referred to as a posted comment) and a photograph (hereinafter, also referred to as a posted photograph). In the second example embodiment, the detection unit 12 has a function of analyzing the posted comments and the posted photographs acquired from the SNS information source 8 to detect the presence or absence of flight of the unmanned aircraft in the surveillance airspace and the presence or absence of the suspicious aircraft 3 in the unmanned aircraft. One of methods for analyzing posted comments and posted photographs is the use of AI technology. In a case where the AI technology is used, an analysis model is given to the suspicious aircraft countermeasure device 10. The analysis model is a model that is generated by machine learning of a large number of posted comments and posted photographs related to the unmanned aircraft, and outputs the presence or absence of the unmanned aircraft in the surveillance airspace and the presence or absence of the suspicious aircraft 3 when the unmanned aircraft is detected using the posted comments and the posted photographs as inputs.

Note that, also in the detection processing using the posted comments and the posted photographs, the detection unit 12 may detect the entry of the suspicious aircraft 3 into the surveillance airspace by referring to the information of the flight status (operation status) of the authorized aircraft 4 in the surveillance airspace as described in the first example embodiment as necessary.

Configurations other than the above in the suspicious aircraft countermeasure device 10 and the suspicious aircraft countermeasure system 1 according to the second example embodiment are similar to the configurations of the suspicious aircraft countermeasure device 10 and the suspicious aircraft countermeasure system 1 according to the first example embodiment.

When the entry of the suspicious aircraft 3 into the surveillance airspace is detected, the suspicious aircraft countermeasure device 10 and the suspicious aircraft countermeasure system 1 according to the second example embodiment take countermeasure processing against the suspicious aircraft 3 after the authorized aircraft 4 has evacuated from the countermeasure area S, as in the first example embodiment. Therefore, also in the second example embodiment, similarly to the first example embodiment, the suspicious aircraft countermeasure device 10 and the suspicious aircraft countermeasure system 1 can prevent the flight of the suspicious aircraft 3 by jamming, net capturing, or the like while preventing adverse effects on the authorized aircraft 4.

In addition, the suspicious aircraft countermeasure device 10 of the second example embodiment detects the presence or absence of the unmanned aircraft in the surveillance airspace and the presence or absence of the suspicious aircraft 3 in the unmanned aircraft when the unmanned aircraft is detected using the posted comment and the posted photograph posted on the SNS. It is assumed that the posted comments and the posted photographs include information of the surveillance airspace viewed from various directions. For this reason, by using not only the detection results from the radio-wave detection sensor, the radar, the LIDAR, and the like output from the detection device 20 but also the posted comments and the information obtained from the posted photographs, the detection unit 12 can increase reliability of the detection of the entry of the suspicious aircraft 3 in the surveillance airspace.

Other Example Embodiments

The present invention is not limited to the first and second example embodiments, and various example embodiments can be adopted. For example, in addition to the configuration in the first and second example embodiments, the suspicious aircraft countermeasure device 10 may have a configuration for moving the countermeasure area S following the movement of the suspicious aircraft 3. For example, the storage device 15 of the suspicious aircraft countermeasure device 10 stores in advance a computer program (countermeasure area setting program) that variably sets the countermeasure area S including the suspicious aircraft 3 based on the flight position of the suspicious aircraft 3.

The detection unit 12 continues the detection processing of detecting the suspicious aircraft 3 even after detecting the entry of the suspicious aircraft 3 into the surveillance airspace, and continuously outputs information indicating the flight position of the suspicious aircraft 3. When the instruction unit 13 receives information indicating the flight position of the suspicious aircraft 3 from the detection unit 12 after outputting the evacuation command to the operation device 30, for example, the instruction unit 13 variably sets the countermeasure area S according to the countermeasure area setting program each time. Further, the instruction unit 13 outputs information indicating the set countermeasure area S to the operation device 30. The operation device operates the authorized aircraft 4 based on the information of the countermeasure area S continuously received from the instruction unit 13 so that the authorized aircraft 4 evacuates from the countermeasure area S. Note that the detection unit 12 may also calculate the flight speed of the suspicious aircraft 3 based on, for example, a detection result from a radar or a LIDAR output from the detection device 20. In addition, the instruction unit 13 may set the countermeasure area S in consideration of the calculated flight speed of the suspicious aircraft 3.

In the first and second example embodiments, the suspicious aircraft countermeasure system 1 includes the detection device 20, but the suspicious aircraft countermeasure system may not include the detection device. For example, in a case where the detection unit 12 of the suspicious aircraft countermeasure device 10 uses the output from the existing radar or the captured image of the existing surveillance camera, the radar and the surveillance camera are information sources of information used for the processing of detecting the unmanned aircraft, but are not included in the suspicious aircraft countermeasure system.

Figure 9:
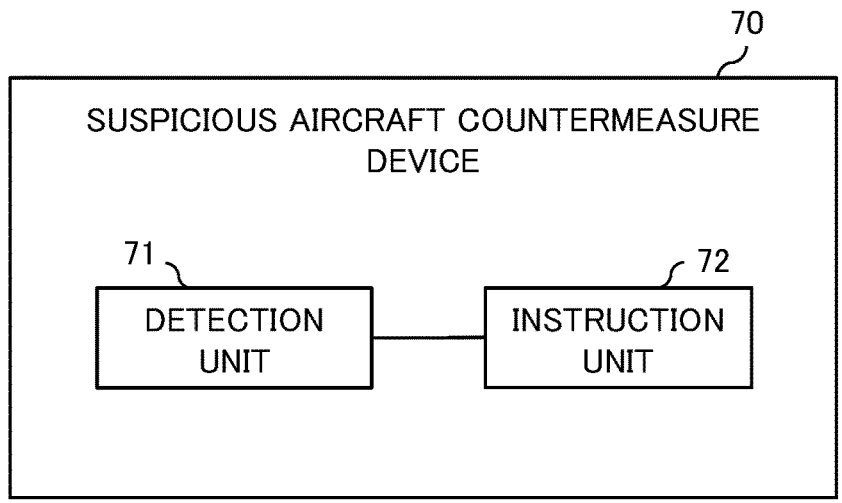
FIG. 9 is a block diagram illustrating a configuration of a suspicious aircraft countermeasure device according to another example embodiment.

FIG. 9 is a block diagram illustrating a configuration of a suspicious aircraft countermeasure device according to another example embodiment. A suspicious aircraft countermeasure device 70 is, for example, a computer device, and includes a detection unit 71 and an instruction unit 72 as functional units. The detection unit 71 detects entry of a suspicious aircraft, which is an unmanned aircraft not authorized to fly in the surveillance airspace, into the surveillance airspace. When detecting the entry of the suspicious aircraft into the surveillance airspace, the instruction unit 72 outputs an evacuation command to evacuate the authorized aircraft, which is the unmanned aircraft authorized to fly in the surveillance airspace, from the countermeasure area including the suspicious aircraft. In addition, the instruction unit 72 outputs a countermeasure command for taking countermeasures against the suspicious aircraft in the surveillance airspace in a state where the authorized aircraft has evacuated from the countermeasure area.

Figure 10:
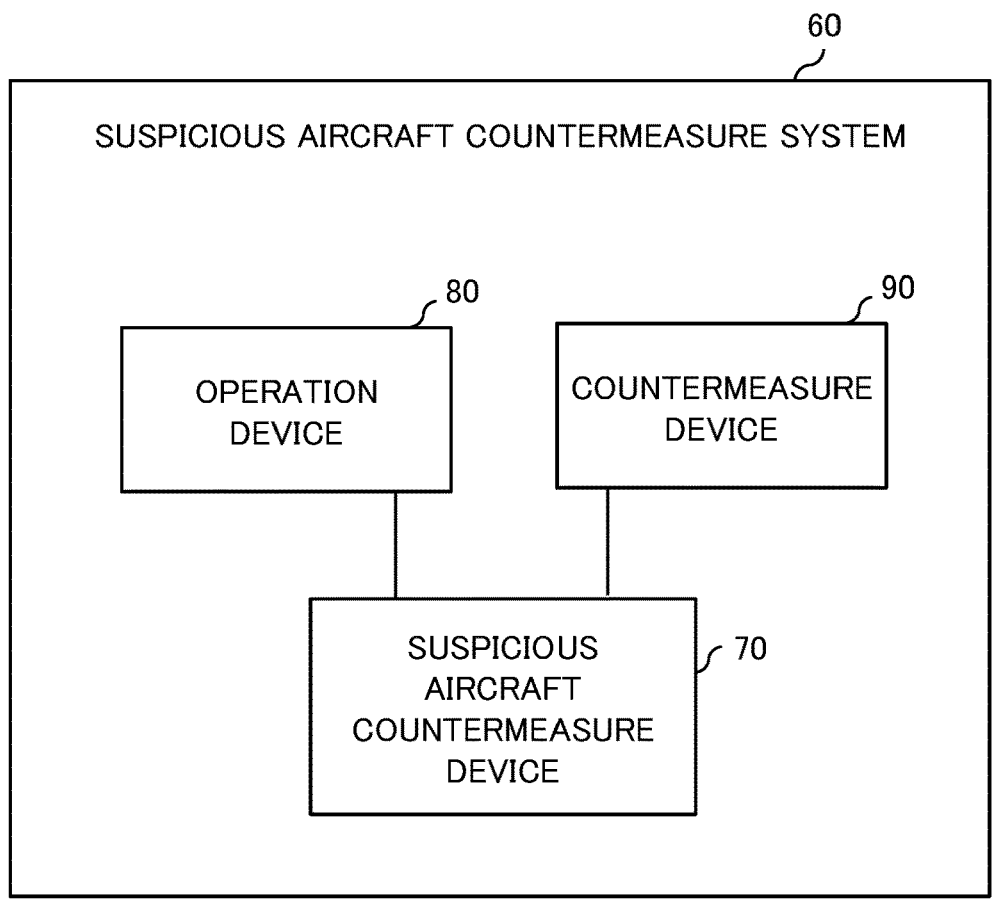
FIG. 10 is a block diagram illustrating a configuration of a suspicious aircraft countermeasure system according to another example embodiment.

Such a suspicious aircraft countermeasure device 70 is incorporated in a suspicious aircraft countermeasure system 60 as illustrated in FIG. 10. The suspicious aircraft countermeasure system 60 includes a suspicious aircraft countermeasure device 70, an operation device 80, and a countermeasure device 90. The operation device 80 receives the evacuation command output from the suspicious aircraft countermeasure device 70, and evacuates the authorized aircraft from the countermeasure area in response to the evacuation command. The countermeasure device 90 receives the countermeasure command output from the suspicious aircraft countermeasure device 70, and takes countermeasures against the suspicious aircraft in the surveillance airspace in a state where the authorized aircraft has evacuated from the countermeasure area in response to the countermeasure command.

FIG. 11 is a flowchart illustrating an example of operation related to countermeasures against the suspicious aircraft in the suspicious aircraft countermeasure device 70. For example, the suspicious aircraft countermeasure device 70 receives information of a detection result from a sensor used for detection of the unmanned aircraft, such as a radio-wave detection sensor, a radar, a LIDAR, or a camera. When the detection unit 71 detects entry of a suspicious aircraft into the surveillance airspace based on the received information (step S201 in FIG. 11), the instruction unit 72 outputs an evacuation command (step S202). The evacuation command is transmitted to the operation device 80, and the operation device 80 receives the evacuation command and evacuates the authorized aircraft from the countermeasure area in response to the evacuation command. In addition, the instruction unit 72 outputs a countermeasure command (step S203). This countermeasure command is transmitted to the countermeasure device 90, and the countermeasure device 90 receives the countermeasure command and takes countermeasures against the suspicious aircraft in the surveillance airspace in a state where the authorized aircraft has evacuated from the countermeasure area in response to the countermeasure command.

The present invention has been described above using the above-described example embodiments as exemplary examples. However, the present invention is not limited to the above-described example embodiments. That is, the present invention can apply various aspects that can be understood by those of ordinary skill in the art within the scope of the present invention.

REFERENCE SIGNS LIST 1, 60 Suspicious aircraft countermeasure system
3 Suspicious aircraft
4 Authorized aircraft
10, 70 Suspicious aircraft countermeasure device
12, 71 Detection unit
13, 72 Instruction unit
30, 80 Operation device
40, 90 Countermeasure device

What is claimed is:

1. A suspicious aircraft countermeasure device comprising:
one or more memories storing instructions; and
one or more processors configured to execute the instructions to:
detect entry of a suspicious aircraft, which is an unmanned aircraft not authorized to fly in a surveillance airspace, into the surveillance airspace; and
when detecting entry of a suspicious aircraft into the surveillance airspace, output an evacuation command to evacuate an authorized aircraft, which is an unmanned aircraft authorized to fly in the surveillance airspace, from a countermeasure area including the suspicious aircraft, and output a countermeasure command to take countermeasures against the suspicious aircraft in the surveillance airspace in a state where the authorized aircraft has evacuated from the countermeasure area.

2. The suspicious aircraft countermeasure device according to claim 1,
wherein the one or more processors are configured to execute the instructions to receive information output from at least one of a radio-wave detection sensor, a radar, a LIDAR, and a camera as sensors used for detection of an unmanned aircraft in the surveillance airspace, and detect entry of the suspicious aircraft into the surveillance airspace based on the received information.

3. The suspicious aircraft countermeasure device according to claim 1,
wherein the one or more processors are configured to execute the instructions to acquire information posted on a social networking service (SNS), and detect entry of the suspicious aircraft into the surveillance airspace based on the acquired information.

4. The suspicious aircraft countermeasure device according to claim 1, wherein the one or more processors are configured to execute the instructions to:
detect a flight position of the suspicious aircraft, and
variably set the countermeasure area in accordance with movement of the suspicious aircraft.

5. The suspicious aircraft countermeasure device according to claim 1,
wherein the one or more processors are configured to execute the instructions to detect a flight trajectory of the suspicious aircraft, and detect entry of the suspicious aircraft into the surveillance airspace using the flight trajectory.

6. A suspicious aircraft countermeasure method for causing a computer to execute:
detecting entry of a suspicious aircraft into a surveillance airspace, the suspicious aircraft being an unmanned aircraft not authorized to fly in the surveillance airspace;
outputting an evacuation command for evacuating an authorized aircraft, which is an unmanned aircraft authorized to fly in the surveillance airspace, from a countermeasure area including the suspicious aircraft when entry of the suspicious aircraft into the surveillance airspace is detected; and
outputting a countermeasure command for taking countermeasures against the suspicious aircraft in the surveillance airspace in a state where the authorized aircraft has evacuated from the countermeasure area.

7. The suspicious aircraft countermeasure method according to claim 6, further comprising:
by a computer,
receiving information output from at least one of a radio-wave detection sensor, a radar, a LIDAR, and a camera as sensors used for detection of an unmanned aircraft in the surveillance airspace; and
detecting entry of the suspicious aircraft into the surveillance airspace based on the received information.

8. The suspicious aircraft countermeasure method according to claim 6, further comprising:
by a computer,
acquiring information posted on a social networking service (SNS); and
detecting entry of the suspicious aircraft into the surveillance airspace based on the acquired information.

9. The suspicious aircraft countermeasure method according to claim 6, further comprising:
by a computer,
detecting a flight position of the suspicious aircraft; and
variably setting the countermeasure area in accordance with movement of the suspicious aircraft.

10. The suspicious aircraft countermeasure method according to claim 6, further comprising:
by a computer,
detecting a flight trajectory of the suspicious aircraft; and
detecting entry of the suspicious aircraft into the surveillance airspace using the flight trajectory.

11. A non-transitory computer readable medium storing a computer program for causing a computer to execute:
a process of detecting entry of a suspicious aircraft into a surveillance airspace, the suspicious aircraft being an unmanned aircraft not authorized to fly in the surveillance airspace; and
a process of outputting an evacuation command for evacuating an authorized aircraft, which is an unmanned aircraft authorized to fly in the surveillance airspace, from a countermeasure area including the suspicious aircraft when entry of the suspicious aircraft into the surveillance airspace is detected, and outputting a countermeasure command for taking countermeasures against the suspicious aircraft in the surveillance airspace in a state where the authorized aircraft has evacuated from the countermeasure area.

12. The non-transitory computer readable medium according to claim 11, wherein the computer program cause further a computer to execute:
a process of receiving information output from at least one of a radio-wave detection sensor, a radar, a LIDAR, and a camera as sensors used for detection of an unmanned aircraft in the surveillance airspace; and
a process of detecting entry of the suspicious aircraft into the surveillance airspace based on the received information.

13. The non-transitory computer readable medium according to claim 11, wherein the computer program cause further a computer to execute:
a process of acquiring information posted on a social networking service (SNS); and a process of detecting entry of the suspicious aircraft into the surveillance airspace based on the acquired information.

14. The non-transitory computer readable medium according to claim 11, wherein the computer program cause further a computer to execute:
a process of detecting a flight position of the suspicious aircraft; and
a process of variably setting the countermeasure area in accordance with movement of the suspicious aircraft.

15. The non-transitory computer readable medium according to claim 11, wherein the computer program cause further a computer to execute:
a process of detecting a flight trajectory of the suspicious aircraft; and
a process of detecting entry of the suspicious aircraft into the surveillance airspace using the flight trajectory.

* * * * *